United States Patent
Bims

(10) Patent No.: US 7,149,196 B1
(45) Date of Patent: Dec. 12, 2006

(54) LOCATION TRACKING IN A WIRELESS COMMUNICATION SYSTEM USING POWER LEVELS OF PACKETS RECEIVED BY REPEATERS

(75) Inventor: Harry Bims, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 918 days.

(21) Appl. No.: 10/044,512

(22) Filed: Jan. 11, 2002

(51) Int. Cl.
*H04Q 7/20* (2006.01)

(52) U.S. Cl. .................. 370/328; 370/400; 455/456.1

(58) Field of Classification Search ............... 370/315, 370/246; 455/440, 513
See application file for complete search history.

(56) References Cited

U.S. PATENT DOCUMENTS

| | | | |
|---|---|---|---|
| 4,534,061 A | 8/1985 | Ulug | |
| 5,461,627 A | 10/1995 | Rypinski | |
| 5,479,400 A | 12/1995 | Dilworth et al. | |
| 5,507,035 A | 4/1996 | Bantz et al. | |
| 5,594,731 A | 1/1997 | Reissner | |
| 5,636,220 A | 6/1997 | Vook et al. | |
| 5,717,688 A | 2/1998 | Belanger et al. | |
| 5,774,461 A | 6/1998 | Hyden et al. | |
| 5,815,811 A | 9/1998 | Pinard et al. | |
| 5,825,776 A | 10/1998 | Moon | |
| 5,862,481 A | 1/1999 | Kulkarni et al. | |
| 5,875,186 A | 2/1999 | Belanger et al. | |
| 5,903,834 A | 5/1999 | Wallstedt et al. | |
| 5,923,702 A | 7/1999 | Brenner et al. | |
| 5,979,757 A | 11/1999 | Tracy et al. | |
| 5,987,062 A | 11/1999 | Engwer et al. | |
| 5,991,287 A | 11/1999 | Diepstraten et al. | |
| 6,002,918 A | 12/1999 | Heiman et al. | |
| 6,038,448 A | 3/2000 | Chheda et al. | |
| 6,052,598 A | * 4/2000 | Rudrapatna et al. | 455/456.1 |
| 6,058,106 A | 5/2000 | Cudak et al. | |
| 6,067,297 A | 5/2000 | Beach | |
| 6,084,528 A | 7/2000 | Beach et al. | |
| 6,097,707 A | 8/2000 | Hodzic et al. | |
| 6,130,896 A | 10/2000 | Lueker et al. | |
| 6,137,791 A | 10/2000 | Frid et al. | |
| 6,137,802 A | 10/2000 | Jones et al. | |
| 6,178,426 B1 | 1/2001 | Klein et al. | |
| 6,188,681 B1 | 2/2001 | Vesuna | |
| 6,199,753 B1 | 3/2001 | Tracy et al. | |
| 6,243,581 B1 | 6/2001 | Jawanda | |
| 6,253,082 B1 | 6/2001 | Hengeveld | |
| 6,259,898 B1 | 7/2001 | Lewis | |

(Continued)

FOREIGN PATENT DOCUMENTS

WO   WO 96/22636   7/1996

OTHER PUBLICATIONS

Lucent Technologies Inc., Orinoco Manager Suite—User's Guide, Nov. 2000.

(Continued)

*Primary Examiner*—Hassan Kizou
*Assistant Examiner*—Brian Roberts
(74) *Attorney, Agent, or Firm*—Sterne, Kessler, Goldstein & Fox P.L.L.C.

(57) ABSTRACT

A location tracking apparatus and method are disclosed. In one embodiment, the method comprises receiving information from each repeater indicating which packets wirelessly transmitted by a mobile station were received by each repeater including received signal strength of each of those packets, and determining location of the mobile station with respect to the repeaters based on power levels of individual wirelessly transmitted packets received at the repeaters.

6 Claims, 17 Drawing Sheets

U.S. PATENT DOCUMENTS

| | | |
|---|---|---|
| 6,285,665 B1 | 9/2001 | Chuah |
| 6,393,261 B1 | 5/2002 | Lewis |
| 6,404,772 B1 | 6/2002 | Beach et al. |
| 6,405,049 B1 | 6/2002 | Herrod et al. |
| 6,411,608 B1 | 6/2002 | Sharony |
| 6,452,915 B1 | 9/2002 | Jorgensen |
| 6,501,582 B1 | 12/2002 | Chiou et al. |
| 6,522,880 B1 | 2/2003 | Verma et al. |
| 6,522,881 B1 * | 2/2003 | Feder et al. ................ 455/437 |
| 6,556,547 B1 | 4/2003 | Srikanth et al. |
| 6,594,475 B1 | 7/2003 | Anvekar et al. |
| 6,674,403 B1 * | 1/2004 | Gray et al. ................ 342/463 |
| 6,745,049 B1 | 6/2004 | Uchida et al. |
| 6,760,318 B1 | 7/2004 | Bims |
| 6,839,560 B1 | 1/2005 | Bahl et al. |
| 7,039,017 B1 | 5/2006 | Sherlock |
| 2001/0024953 A1 * | 9/2001 | Balogh ....................... 455/432 |
| 2002/0037719 A1 | 3/2002 | Ariga et al. |
| 2002/0060995 A1 | 5/2002 | Cervello et al. |
| 2002/0075825 A1 | 6/2002 | Hills et al. |
| 2002/0085719 A1 | 7/2002 | Crosbie |
| 2002/0131386 A1 | 9/2002 | Gwon |
| 2002/0157965 A1 | 10/2002 | Beasley et al. |
| 2002/0167965 A1 | 11/2002 | Beasley et al. |
| 2002/0188723 A1 | 12/2002 | Choi et al. |
| 2003/0012168 A1 * | 1/2003 | Elson et al. ................ 370/338 |
| 2003/0021250 A1 * | 1/2003 | Willins et al. ............. 370/338 |
| 2003/0087629 A1 * | 5/2003 | Juitt et al. .................. 455/411 |
| 2003/0120801 A1 * | 6/2003 | Keever et al. ............. 709/237 |
| 2003/0133422 A1 | 7/2003 | Bims |
| 2003/0146835 A1 * | 8/2003 | Carter ................... 340/539.13 |
| 2004/0152471 A1 * | 8/2004 | MacDonald et al. ..... 455/456.1 |

OTHER PUBLICATIONS

PCT International Search Report mailed Apr. 15, 2003 for International Application No. PCT/US03/00783 (3 pages).

PCT International Search Report mailed Apr. 25, 2003 for International Application No. PCT/US03/00782 (5 pages).

Messier, Andrew et al., "Performance Monitoring of a Wireless Campus Area Network," Local Computer Networks, 1997, Proceedings, 22$^{nd}$ Annual Conference on Nov. 1997, pp. 232-238.

Bahl, Paramvir and Padmanabhan, Venkata N., "RADAR: An In-Building RF-based User Location and Tracking System," Proceedings of IEEE INFOCOMM 200, Mar. 2000, pp. 775-784.

Karkhanechi et al., Voice Quality of Cellular Mobile Phones:, IEEE, Aug. 3-6, 1997, pp. 485-488.

H. Bims, , U.S. Appl. No. 10/133,804, filed Apr. 25, 2002, entitled "Reconfiguration Of A Communication System".

* cited by examiner

LOCATION TRACKING IN A WIRELESS COMMUNICATION SYSTEM USING POWER LEVELS OF PACKETS RECEIVED BY REPEATERS

FIELD OF THE INVENTION

The present invention relates to the field of wireless communications; more particularly, the present invention relates to receiver diversity in a wireless communications system.

BACKGROUND OF THE INVENTION

FIG. 1 illustrates an exemplary network environment used today. Referring to FIG. 1, a corporate Local Area Network (LAN) backbone 102 interfaces to a number of desktop computers $103_1$–$103_n$ and may interface to Internet 101. Corporate LAN backbone 102 may comprise a firewall 102A, corporate server 102B, and a standard Ethernet switch 102C. Ethernet switch 102C includes an interface by which desktops $103_1$–$103_{1n}$ are coupled to the corporate LAN backbone 102 and may access corporate sever 102B and Internet 101 (via firewall 102A).

More recently, Wireless LANs (WLANs) are being installed. Many of the recently implemented WLANs operate according to the protocol set forth in the 802.11 Standard, particularly as more enterprises are adopting the 802.11 Standard. ISO | IEC DIS 8802.11

FIG. 2 illustrates one embodiment of an 802.11 based WLAN (LAN) system. Referring to FIG. 2, the Internet or other LAN 201 is coupled to an 802.11 server 203 via firewall (FW) 202. Server 203 communicates with mobile stations in a number of 802.11 cells $206_1$–$206_n$ using an access point in each of cells $206_1$–$206_n$, such as access point 204. Server 203 is coupled to access points such as access point 204, via an Ethernet connection. There is one access point for each of the 802.11 cells $206_1$–$206_n$. Mobile stations in each of the 802.11 cells, such as laptops $205_1$ and $205_2$ in cell $206_1$, communicate wirelessly with the access points via the 802.11 protocol. The communications from mobile stations in the 802.11 cells to the access points are forwarded through to server 203 and potentially to Internet/LAN 201, while communications from Internet/LAN 201 are forwarded through server 203 to the mobile stations via the access points.

There are a number of problems associated with the current implementations of 802.11 networks. For example, in order to set up an 802.11 network such as shown in FIG. 2, a site survey is required in order to determine where each of the access points are placed to ensure that the 802.11 cells provide complete coverage over a particular geographic area. This may be costly. Also, the cost of each of the access points is approximately $500.00. Generally, such a high cost is a deterrent to having a large number of access points. However, by reducing the number of access points, coverage diminishes and the 802.11 network is less effective. Furthermore, there are a number of mobility problems associated with the current 802.11 network deployments. For example, the 802.11 standard sets forth a number of solutions to handle the issue of mobility of mobile stations between the 802.11 cells. However, these schemes do not work effectively as there is no standard solution in place and users haven't indicated a desire for long-term proprietary solutions.

SUMMARY OF THE INVENTION

A location tracking apparatus and method are disclosed. In one embodiment, the method comprises receiving information from each repeater indicating which packets wirelessly transmitted by a mobile station were received by each repeater including received signal strength of each of those packets, and determining location of the mobile station with respect to the repeaters based on power levels of individual wirelessly transmitted packets received at the repeaters.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
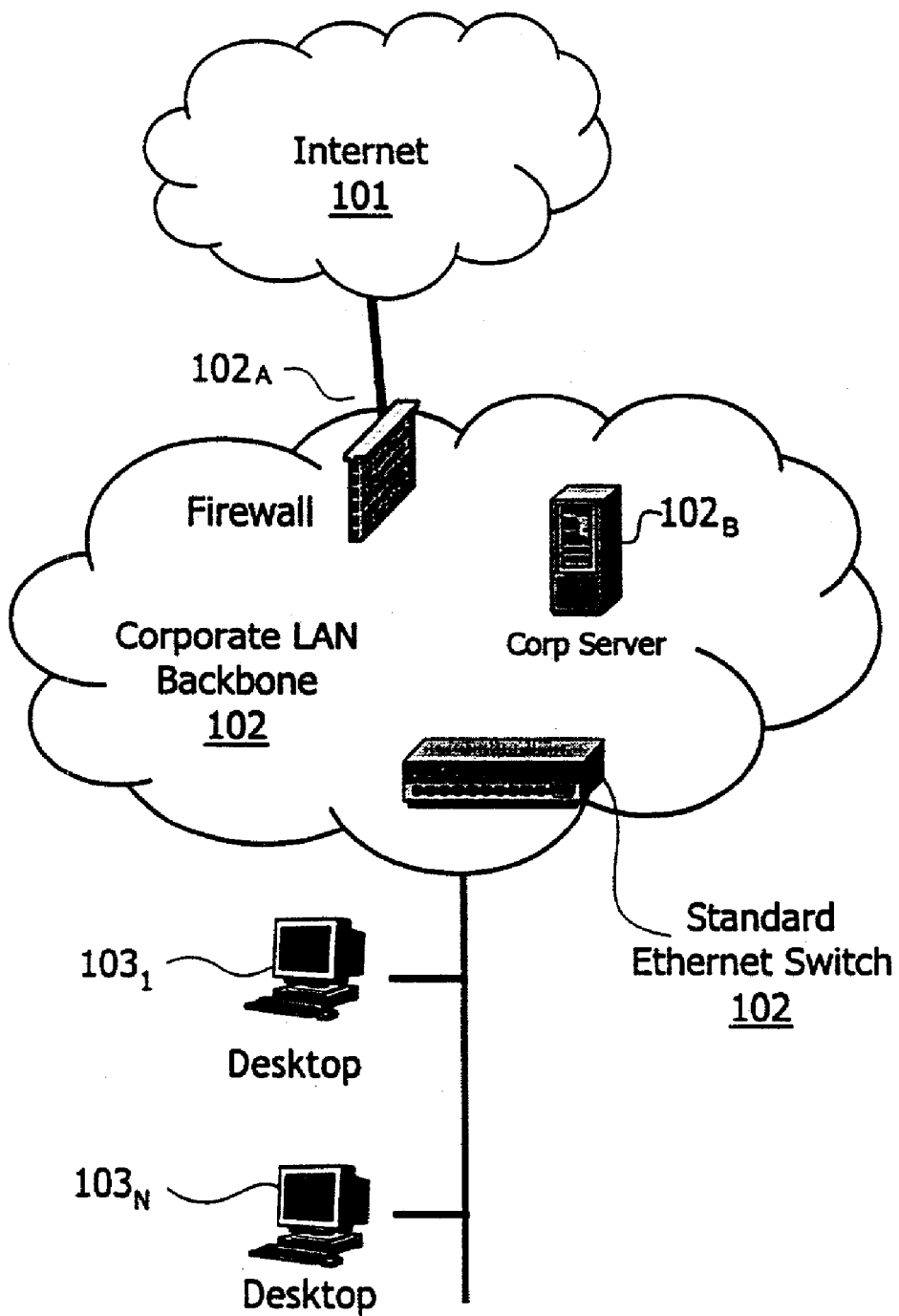
FIG. 1 illustrates an exemplary network environment used today.
Figure 2:
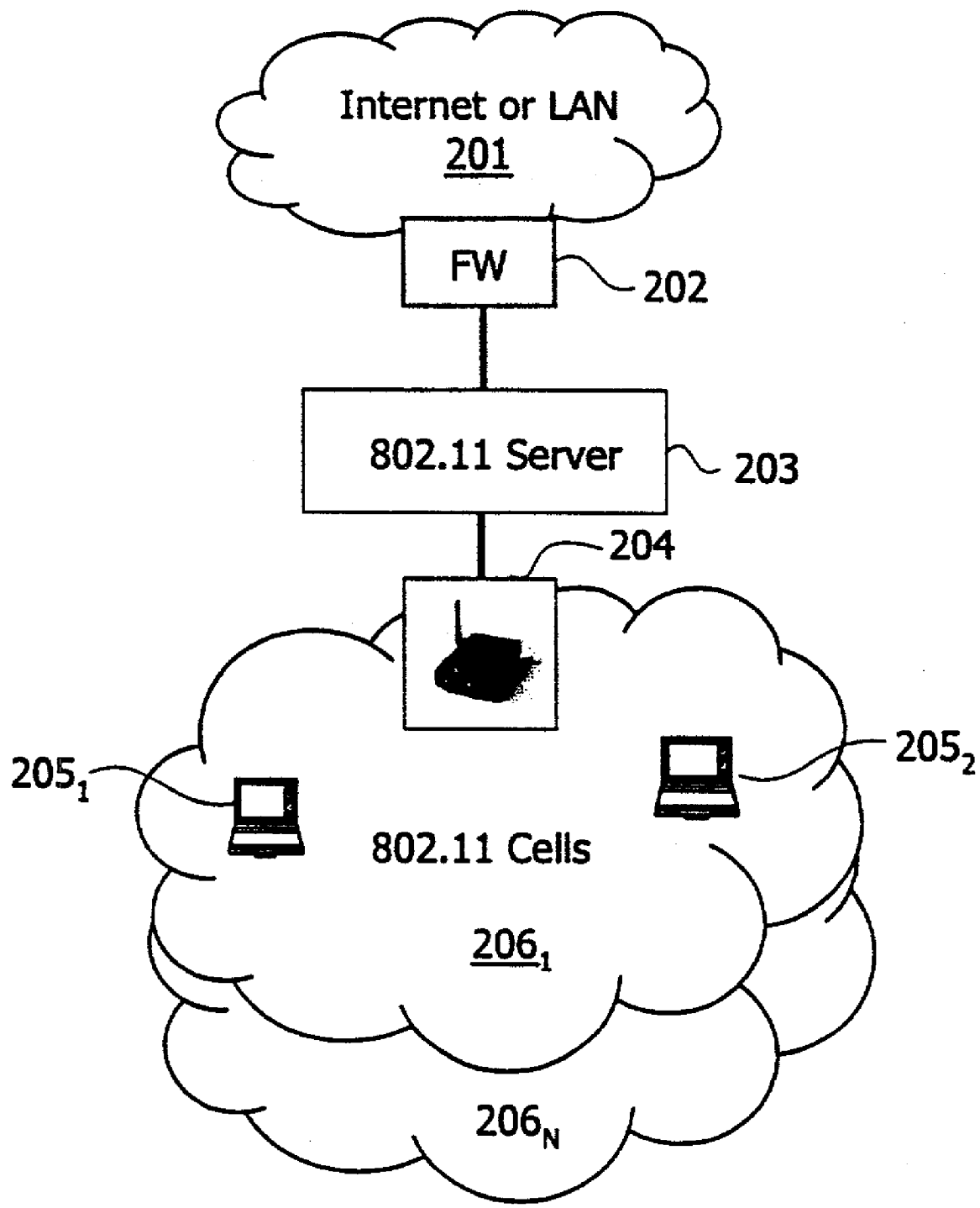
FIG. 2 illustrates one embodiment of an 802.11 based wireless LAN-based (LAN) system.

A communication system is described. In one embodiment, the communication system comprises a mobile station having a transmitter to transmit packets wirelessly according to a protocol and multiple repeaters communicably coupled with the mobile station. Each of the plurality of repeaters receives one or more packets of the wirelessly transmitted packets from the mobile station. Each of the repeaters receives an indication of which of the wirelessly transmitted packets were received without errors by other repeaters and a received signal strength for those packets. The communication system also includes a switch coupled to the repeaters. Each of the repeaters forwards to the switch each packet of the wirelessly transmitted packets that each repeater had received at a received signal strength higher than any other repeater.

In the following description, numerous details are set forth in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Exemplary Network Architecture

Figure 3:
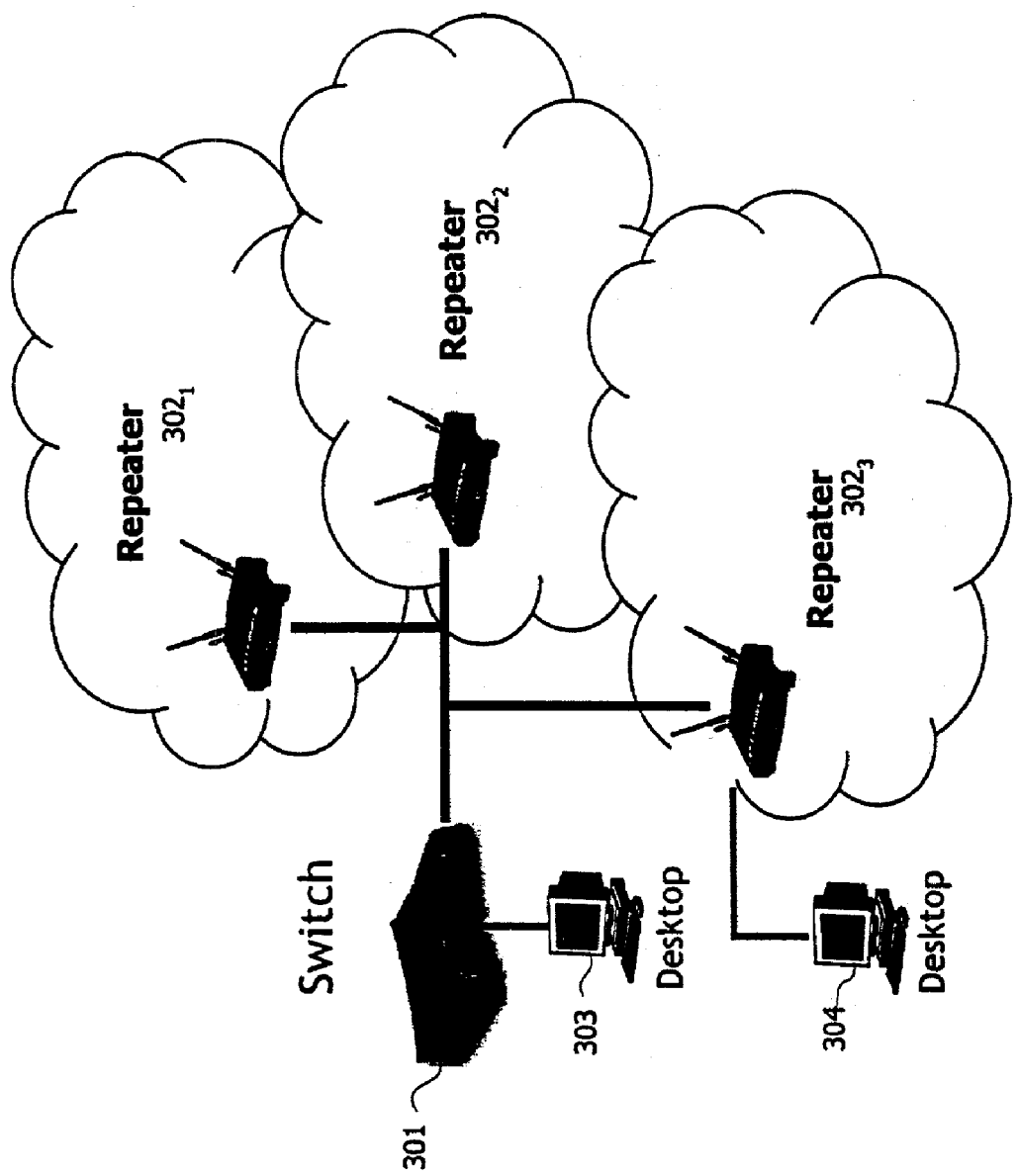
FIG. 3 iillustrates one embodiment of a network architecture.

FIG. 3 illustrates one embodiment of a network architecture. Referring to FIG. 3, a LAN backbone 102 interfaces a number of desktops $103_1$–$103_n$ to Internet 101. Note that the present invention does not require that a LAN backbone be included. All that is necessary is that there be a communication mechanism that is capable of receiving packets from other devices and/or sending packets to other devices.

Similar to FIG. 1, LAN backbone 102 includes firewall 102A, corporate server 102B and Ethernet switch 102C. However, in contrast to FIG. 1, LAN backbone 102 also includes switch 301 which interfaces to repeaters $302_1$–$302_3$. Although only three repeaters are shown, alternative embodiments may utilize any number of repeaters with a minimum of one. In one embodiment, switch 301 is coupled to repeaters $302_1$–$302_3$ via a wired connection, such as cabling. In one embodiment, the wired connection may comprise CAT5 cabling.

Each of the repeaters $302_1$–$302_3$ receives wireless communications from devices (e.g., mobile stations such as, for example, a mobile phone, a cellular phone, a cordless phone, a headset, a voice-enabled mobile station, a laptop computer system, a personal digital assistant, a computer-data-enabled mobile station, a speakerphone, video game controller, a DVD controller, a stereo controller, a TV controller, etc.) in the coverage areas of the repeaters. In one embodiment, these wireless communications are performed according to the 802.11 protocol. That is, each of the mobile stations in each of cells $310_1$–$310_n$ exchanges packets with the repeaters $302_1$–$302_3$ using the 802.11 protocol.

In one embodiment, switch 301 includes 802.11 MAC protocol software that allows switch 301 to communicate with repeaters $302_1$–$302_3$. Different from the prior art, many of the 802.11 MAC functionality typically associated with the access points, as described above in the Background section, are taken out of the repeaters $302_1$–$302_n$ and centralized in switch 301. More specifically, the MAC layer is split to enable transfer of messages over wiring (e.g., CAT5 cabling). As such, repeaters $302_1$–$302_3$ and switch 301 are interfaced at the inside the 802.11 MAC layer as described below.

In one embodiment, switch 301 includes one or more Ethernet connectors (e.g., external Ethernet connector) so that a computer system, such as desktop computer system 303, or other device, has an Ethernet connection to LAN backbone 102 via switch 301. Similarly, in one embodiment, one or more of repeaters $302_1$–$302_3$ includes an Ethernet connector to enable a device (e.g., computer system, such as desktop computer system 304) to gain access, via a repeater, such as repeater $302_3$, to switch 301 and the rest of the communication system. In such a case, the wiring coupling switch 301 to repeaters $302_1$–$302_3$ may combine 802.11 information including management and control (as opposed to solely data) information with traditional Ethernet packets on the same wiring (e.g., CAT5).

Distributed Receiver Diversity Approach

The network architecture described above allows for overlapping coverage between cells supported by the repeaters. This overlapping coverage allows for receiver diversity.

The packets from the mobile stations in each of the cells are broadcast and may be received by multiple repeaters. By allowing multiple repeaters to receive packets from one of the mobile stations, collisions and dropped packets may be reduced or avoided. For example, if a collision occurs or if a packet is dropped by one of the repeaters, then a particular packet can still be received by other repeaters. In this manner, the use of repeaters described herein provides for higher reliability.

In an embodiment in which mobile stations exchange packets with repeaters using the 802.11 protocol, each packet from a mobile station includes an Ethernet MAC address, which is embedded in the packet. Each packet may be received by one or more repeaters. Each repeater that receives a packet from a mobile station without errors (i.e., cleanly) determines the received signal strength of the packet in a manner well-known in the art. The received signal strength is converted into an indication, such as a received signal strength indicator (RSSI). The repeater forwards the packet, along with the RSSI. In one embodiment, the repeater encapsulates the packet into an Ethernet packet with the RSSI in a header and forwards the Ethernet packet to switch 301. In one embodiment, the RSSI is specified in a value from 1 to 127. These 128 discrete values can be mapped to dB signal strength values based on the particular implementation being used. Thus, all packets received from mobile stations by a repeater without errors are forwarded to switch 301. Switch 301 knows which repeater sent the packet(s) because it is received on its preassigned port.

In one embodiment, the fact that a particular repeater received a packet without errors is communicated to all other repeaters. In one embodiment, this is accomplished by having the repeater send each encapsulated packet and its RSSI as a broadcast packet to switch 301. This broadcast packet is similar to those broadcast packets used in Ethernet and includes a special broadcast address, which is recognized by switch 301. In another embodiment, only the header of the packet, which includes the RSSI and uniquely identifies the packet, is encapsulated and sent as a broadcast packet to the other repeaters. In this case, the data portion of the packet is not forwarded.

In response to receiving the broadcast packet with the specific broadcast address, switch 301 broadcasts the packet on all of the other ports used for communication between switch 301 and the other repeaters.

In one embodiment, upon receiving a packet without error from a particular mobile station, the repeater sets a timer within which it is to receive packets received by other repeaters that are duplicates to the packet it has already received. When the timer expires, the repeater examines the RSSI of the packet it received (without error) with the RSSI values of duplicate packets received by other repeaters. Based on that information, the repeater determines if it is to send the acknowledgement packet. Thus, if the time expires without receiving a duplicate packet, the repeater sends the acknowledgement. If the timer expires and the repeater receives a duplicate packet, thereafter, it is treated as a new packet. To avoid this, the timer time out value is set to handle the worst case time delay that a repeater may face in receiving duplicate packets.

Note that switch 301 forwards each packet received from repeaters (note duplicates) to the rest of the communication system (e.g., LAN backbone, other mobile stations, the Internet, etc.). In one embodiment, this occurs after deduplication of packets so that only one copy of each packet is forwarded.

Once the broadcast packets have been received, all the repeaters know what packets were received cleanly by the others and at what RSSI the packets were received by the other repeaters. Thereafter, each repeater selects the packet with the highest RSSI and determines the repeater that received it. In other words, each repeater performs a comparison on the received signal strength of the packets it received that were also received by one or more other repeaters. For each of the packets that a repeater receives at a power level higher than any of the other repeaters that received that packet, that repeater sends an acknowledgement back to the mobile station acknowledging that the packet was received without errors. This prevents all the repeaters that receive the packet cleanly from sending multiple acknowledgements to mobile station.

In one embodiment, if two repeaters have the same receive signal strength for a packet, the repeater with the lower port number (the port number by which switch 301 is coupled to the repeater) is the repeater that is elected to send the acknowledgement to the mobile station. In this manner, only one repeater is selected to send the acknowledgement to the mobile station and, thus, the receiver diversity is handled in the network architecture in a distributed fashion. In one embodiment, to enable the repeaters to determine which is to send the acknowledgement in case of a packet received with the same received signal strength by multiple repeaters, each packet includes identification information, such as its switch port number, to enable the determination of which has the lowest port number. Note, in an alternative embodiment, the repeater with the highest port number may be the one to send the acknowledgement or other preassigned priority information may be used by the repeaters in such situations.

Figure 4A:
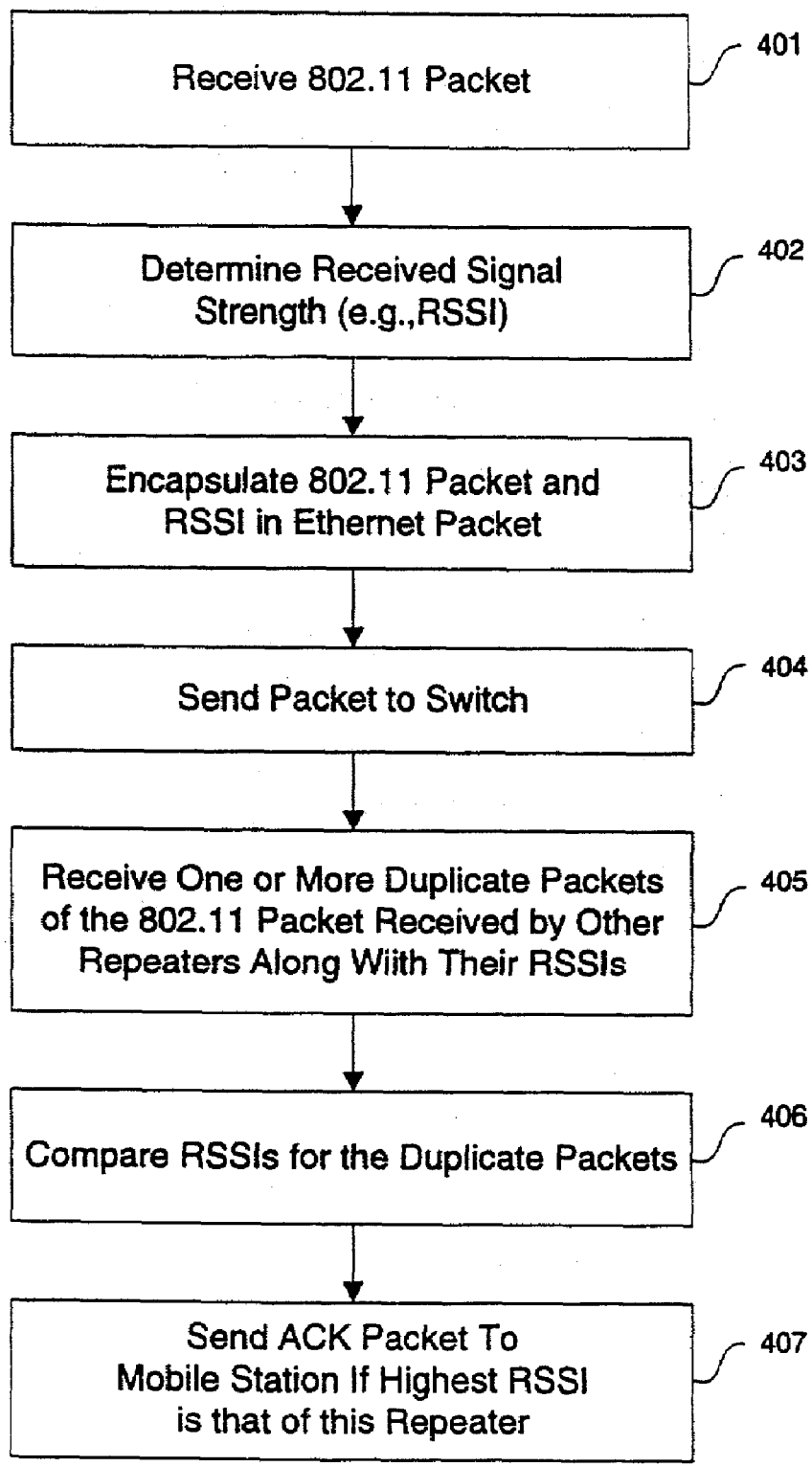
FIG. 4A is a flow diagram of one embodiment of a receiver diversity processing performed by a repeater.

FIG. 4A is a flow diagram of one embodiment of a receiver diversity process performed by a repeater. The process is performed by processing logic that may comprise hardware (circuitry, dedicated logic, etc.), software (such as is run on a general purpose computer system or a dedicated machine), or a combination of both.

Referring to FIG. 4A, processing logic initially receives a 802.11 packet (processing block 401). In response to the 802.11 packet, processing logic determines the received signal strength (e.g., RSSI) (processing block 402). In one embodiment, this processing logic comprises a hardware mechanism, such as a radio frequency (RF) device (e.g., integrated circuit (e.g., RF IC 1002 in FIG. 10)) in the repeater. In such a case, the RF device sends the RSSI to a baseband processor in the repeater.

Thereafter, processing logic encapsulates 802.11 packet and RSSI in an Ethernet packet (processing block 403) and sends the Ethernet packet to the switch (processing block 404). In one embodiment, a baseband processor (e.g., baseband processor 1001 in FIG. 10) performs the encapsulation and sends the Ethernet packet to the switch.

Later in time, processing logic receives one or more packets from the switch that are duplicates of the 802.11 packet. These duplicate packets are transmitted by other repeaters and encapsulated by those repeaters, along with their RSSIs (processing block 405). Processing logic in the repeater compares RSSIs for the duplicate packets (processing block 406). In one embodiment, a baseband processor (e.g., baseband processor 1001 in FIG. 10) performs the comparison. If the repeater determines it received the 802.11 packet with the highest RSSI, then processing logic sends the acknowledgment packet to the mobile station (processing block 407).

Figure 4B:
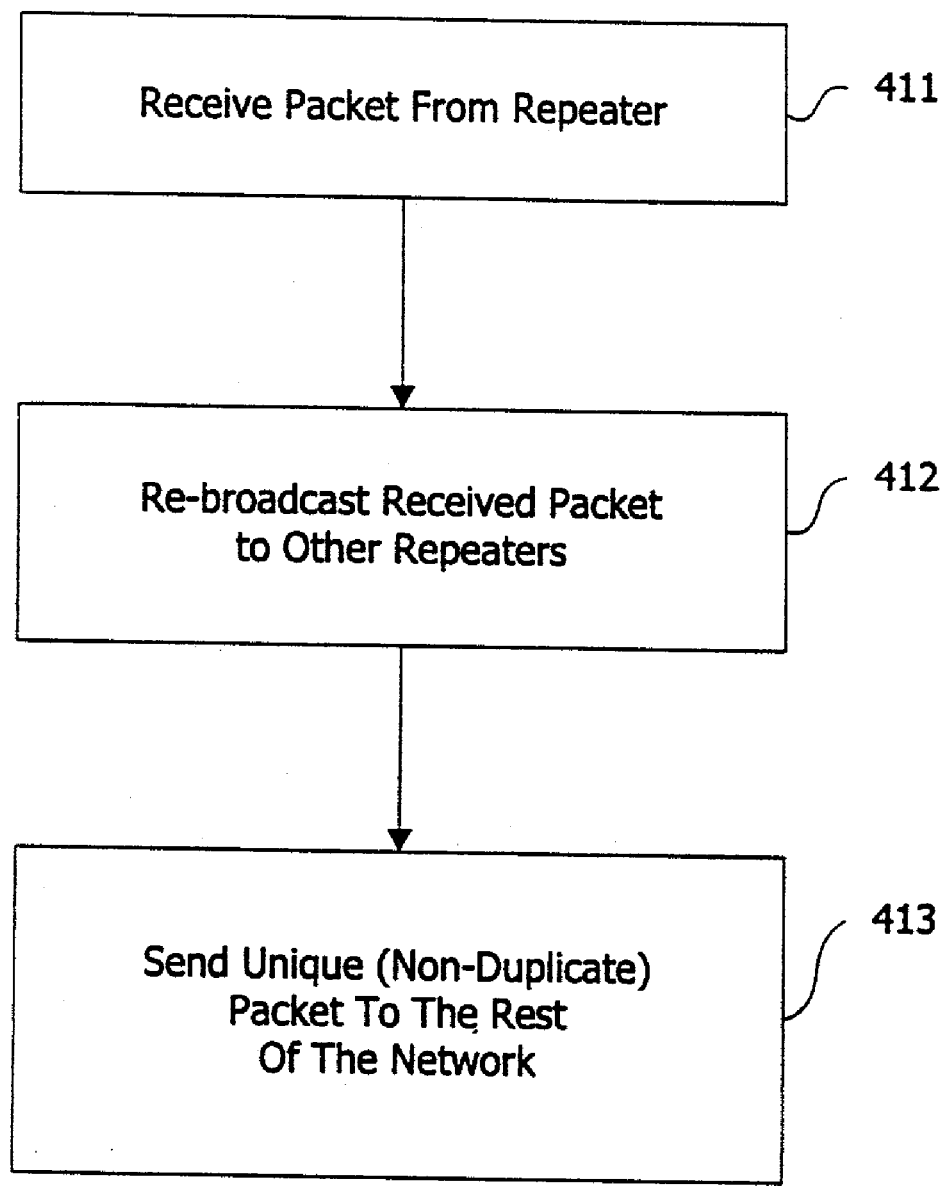
FIG. 4B is a flow diagram of one embodiment of a receiver diversity processing performed by a switch.

FIG. 4B is a flow diagram of one embodiment of a receiver diversity processing performed by a switch. The process is performed by processing logic that may comprise hardware (circuitry, dedicated logic, etc.), software (such as is run on a general purpose computer system or a dedicated machine), or a combination of both.

Referring to FIG. 4B, processing logic initially receives a packet from a repeater (processing block 411). In response to the packet, processing logic determines that the packet is to be sent to the other repeaters and re-broadcasts the received packet to other repeaters (processing block 412). Then processing logic sends only one copy of the packet to the rest of the network (processing block 413).

Token-Based Receiver Diversity Approach

Note that the above receiver diversity procedure is particularly useful when gigabit or faster Ethernet communication exists between switch 301 and repeaters $302_1$–$302_n$. However, if such is not the case, another technique for receiver diversity may be utilized. For example, a token-based receiver diversity procedure may be used. In this case, switch 301 has a token for every mobile station on the 802.11 network and it gives the token to one of the repeaters. In other words, switch 301 pre-assigns the token before a packet is even transmitted by a mobile station. The repeater stores the token in a table that lists all mobile stations for which it has a token. The repeater with the token sends the acknowledgement packet to the mobile stations listed in the table when those mobile stations send packets that are received by the repeater. Therefore, a comparison of received signal strengths for duplicate packets is not necessary. Note that this token based mechanism, if the repeater with the token does not receive a packet cleanly, but another repeater does, that packet will be forwarded to the switch and not acknowledged to the mobile client. However, the switch moves the token before a subsequent packet is sent by mobile station. Therefore, this will only occur for one packet.

In one embodiment, switch 301 includes a database with a listing of mobile stations and repeater numbers corresponding to the repeater that has been designated to acknowledge packets received from the mobile station and, thus, has the token. The table may also include additional information describing the repeater itself.

Since switch 301 receives all packets and their received signal strength, switch 301 can determine the closest repeater to a particular mobile station. If the repeater determined to be closest to the particular mobile station is different than the one previously identified as closest, then switch 301 moves the token to a new repeater, i.e. the one that is closer to the mobile station. The token may be moved on a packet-by-packet basis or every predetermined number of the packets (e.g., 10 packets, 100 packets, etc.).

Switch 301 may employ a timer to indicate the time during which duplicate packets may be received in much the same manner the timer is used by the repeaters in the distributed approach described above.

Figure 4C:
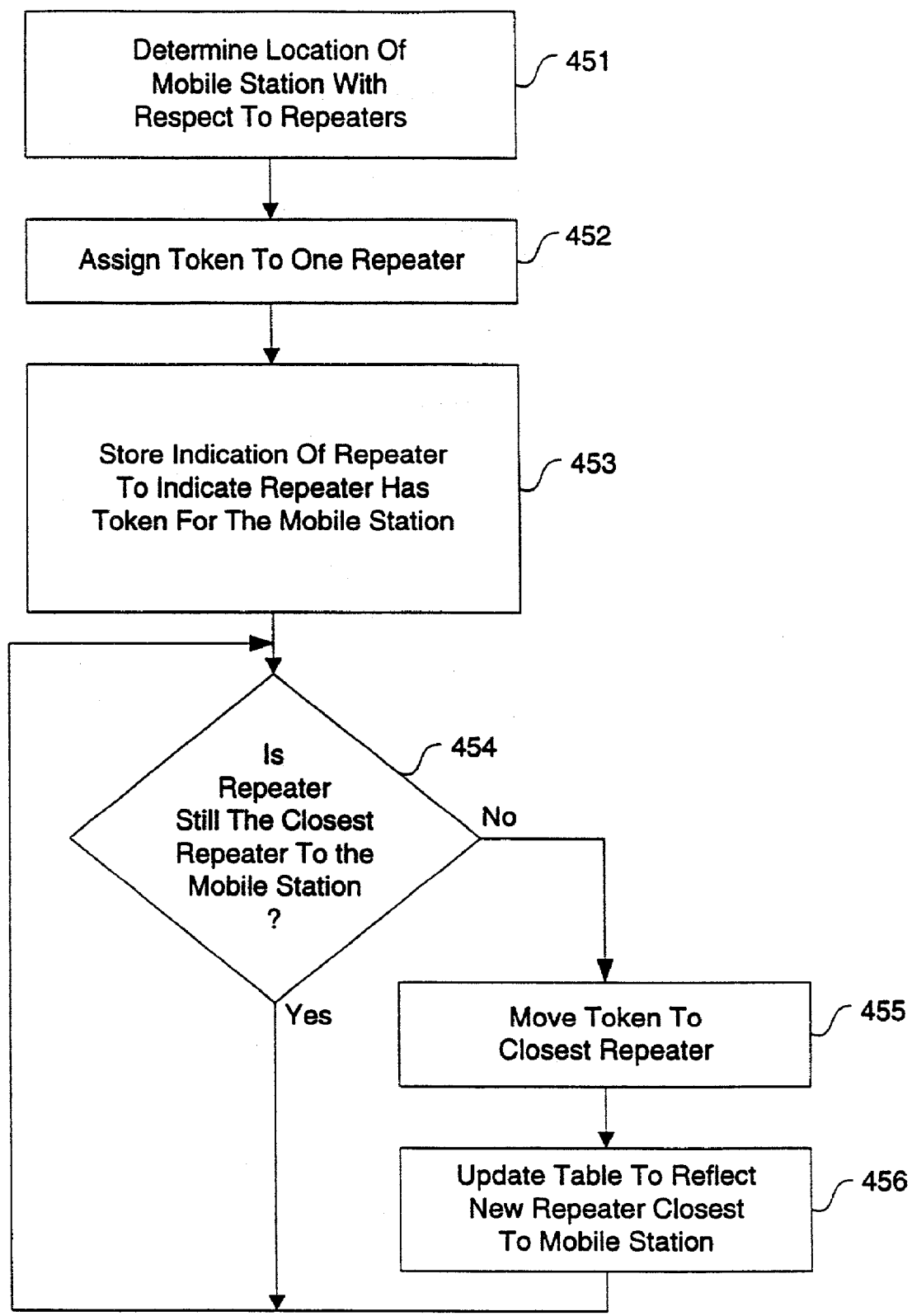
FIG. 4C is a process for managing repeaters using a token-based mechanism.

FIG. 4C is a process for managing repeaters using a token-based mechanism. The process is performed by processing logic that may comprise hardware (circuitry, dedicated logic, etc.), software (such as is run on a general purpose computer system or a dedicated machine), or a combination of both.

Referring to FIG. 4C, processing logic first determines the location of mobile stations with respect to repeaters (processing block 451). Processing logic then assigns a token for each of the mobile stations to one of the repeaters (processing block 452) and stores an indication of the repeater assigned to each mobile station (processing block 453). This information is stored in a table in memory. In one embodiment, this table includes a listing of mobile stations and an indication of which repeater and/or switch port number is assigned to the mobile station. The table may be the same data structure used for location tracking described below.

In one embodiment, the switch assigns a token by sending an Add Token command to the repeater, which causes the repeater to add a new mobile station to its table of mobile devices that the repeater supports. This command includes the MAC address of the mobile station.

Subsequently, processing logic periodically tests whether the repeater assigned the token for a particular mobile station is still the closest repeater to that mobile station (processing block 454). If so, then the processing is complete. If not, then processing logic moves the token to the closest repeater (processing block 455) and updates the table to reflect the new repeater that is closest to the mobile station (processing block 456). Processing logic also updates the switch port to reflect the new repeater for use when sending packets to the mobile station from the switch.

In one embodiment, the switch moves the token by sending a Delete Token command to the repeater that currently has it, causing the repeater to delete the token (and assorted MAC Address) from its list of supported mobile stations, and by sending an Add Token command to the repeater that is currently closest to the mobile station.

Figure 4D:
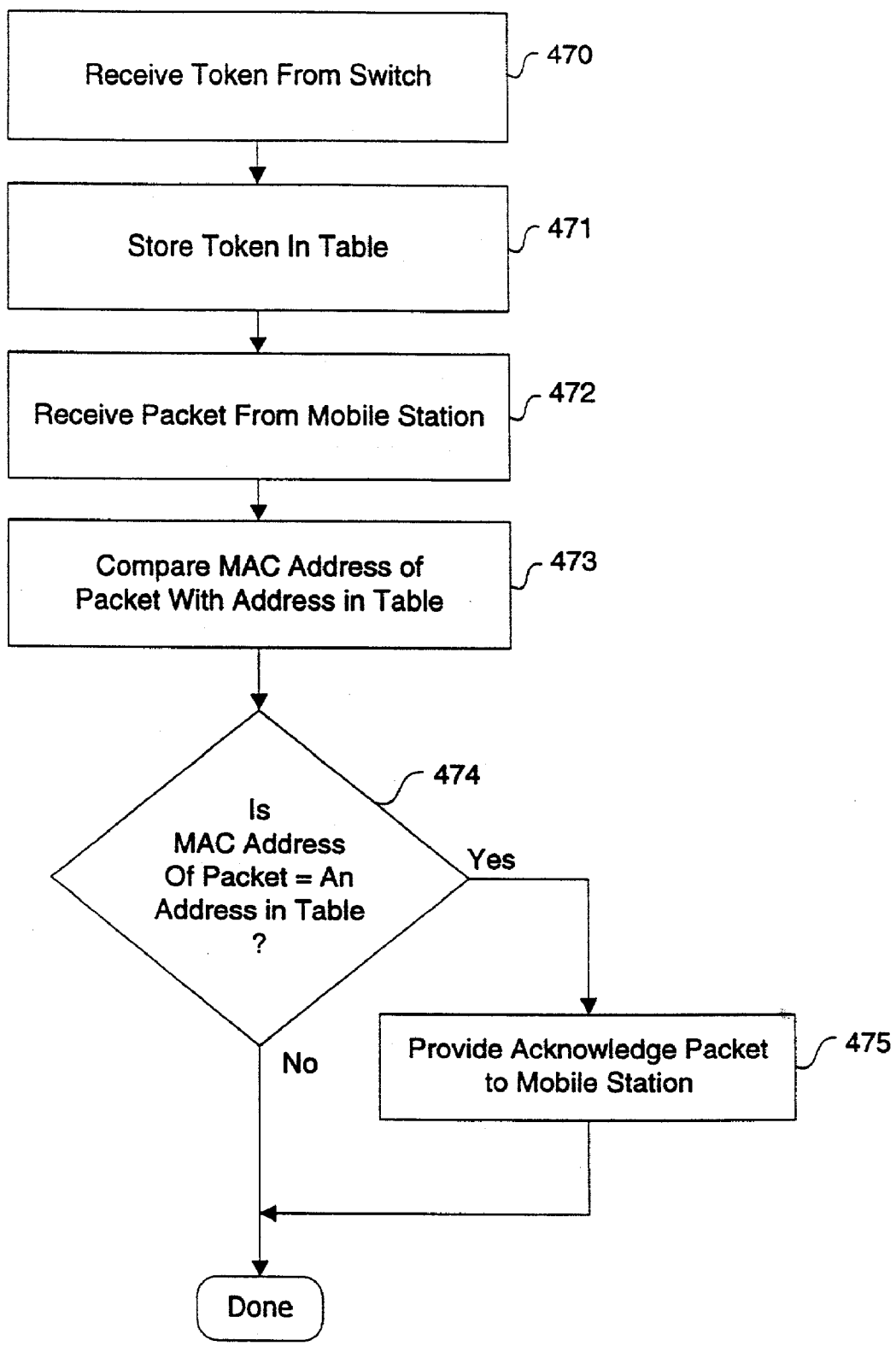
FIG. 4D is one embodiment of a token-based process for handling packets.

FIG. 4D is one embodiment of a token-based process for handling packets. The process is performed by processing logic that may comprise hardware (circuitry, dedicated logic, etc.), software (such as is run on a general purpose computer system or a dedicated machine), or a combination of both.

Referring to FIG. 4D, processing logic receives a token from the switch (processing block 470) and stores the token in a table stored in a repeater memory that indicates all the mobile stations for which the repeater has a token (processing block 471).

Subsequently, when processing logic receives a packet from mobile station (processing block 472), processing logic compares the MAC address of the 802.11 packet from the mobile station with the address in the table (processing block 473). At this time, processing logic tests whether the MAC address of a packet equals an address in the table (processing block 474). If so, processing logic provides an acknowledgment (ACK) packet to the mobile station (processing block 475). If not, processing logic ignores the packet.

Note that since all repeaters communicate the fact that they received a packet from a mobile station along with the received signal strength to switch 301, switch 301 is able to determine the coverage area of the transmission of the mobile station. In one embodiment, each packet received by the switch 301 from the repeaters terminates in a network processor in switch 301 (e.g., network processor 1206 of FIG. 12), which determines the coverage area because it has access to the RSSI values. By determining the coverage area of the transmission, switch 301 is able to track the location of a particular device.

Downstream Communication Scheduling

For communications in the reverse direction (e.g., in the downstream direction), in one embodiment, the repeater transmitters are scheduled to reduce collisions. This scheduling is useful because repeaters can be close enough to interfere with one another. Because of this, switch 301 schedules the transmissions to prevent the collisions when the repeaters are actually transmitting.

For example, if a packet is destined for a particular IP address, then switch 301 performs an address translation to translate, for example, the IP address into an Ethernet MAC address. Switch 301 uses the Ethernet MAC address to search in a location tracking database to determine which repeater is closest to the mobile station having the Ethernet MAC address. Once the repeater is identified by switch 301, then switch 301 knows the switch port on which the packet should be sent so that it is sent to the repeater listed in the location tracking database (for forwarding by the repeater to the mobile station).

Once the repeater (and the port number) has been identified, switch 301 checks whether an interference problem would be created if the packet is sent by switch 301 to the mobile station at that time. An interference problem would be created if there are other transmissions that would be occurring when the packet is forwarded onto its destination mobile station. If no interference problem would exist, switch 301 sends the packet through the identified port to the repeater most recently determined to be closest to the mobile station. However, if an interference problem would be created by sending the packet immediately, then switch 301 delays sending the packet through the identified port to the repeater most recently determined to be closest to the mobile station.

In one embodiment, to determine if an interference problem would exist if a packet is sent immediately upon determining the switch port number on which the packet is to be sent, switch 301 maintains and uses two databases. One of the databases indicates which of the repeaters interfere with each other during their transmissions. This database is examined for every downstream packet that is to be sent and switch 301 schedules the transmission of downstream packets so that repeaters that interfere with each other when they transmit at the same time do not transmit at the same time. The other database is a listing of mobile stations and the corresponding set of repeaters that last received the transmissions. If two mobile stations have overlapping sets, then it is possible for their acknowledgement packets to interfere when they simultaneously receive non-interfering data packets from different repeaters. Because mobile stations send acknowledge packets upon receiving downstream packets, there is a possibility that mobile stations will interfere with each other when sending their acknowledgement packets. Switch 301 takes this information into account during scheduling and schedules downstream packets to the mobile stations to reduce the occurrence of mobile stations interfering with other when sending acknowledgment packets.

The information in these two databases may be collected by sending out test packets to the WLAN to determine which repeaters and mobile devices cause the interference described above.

Location—Tracking by Received Signal Strength (RSSI)

Figure 5A:
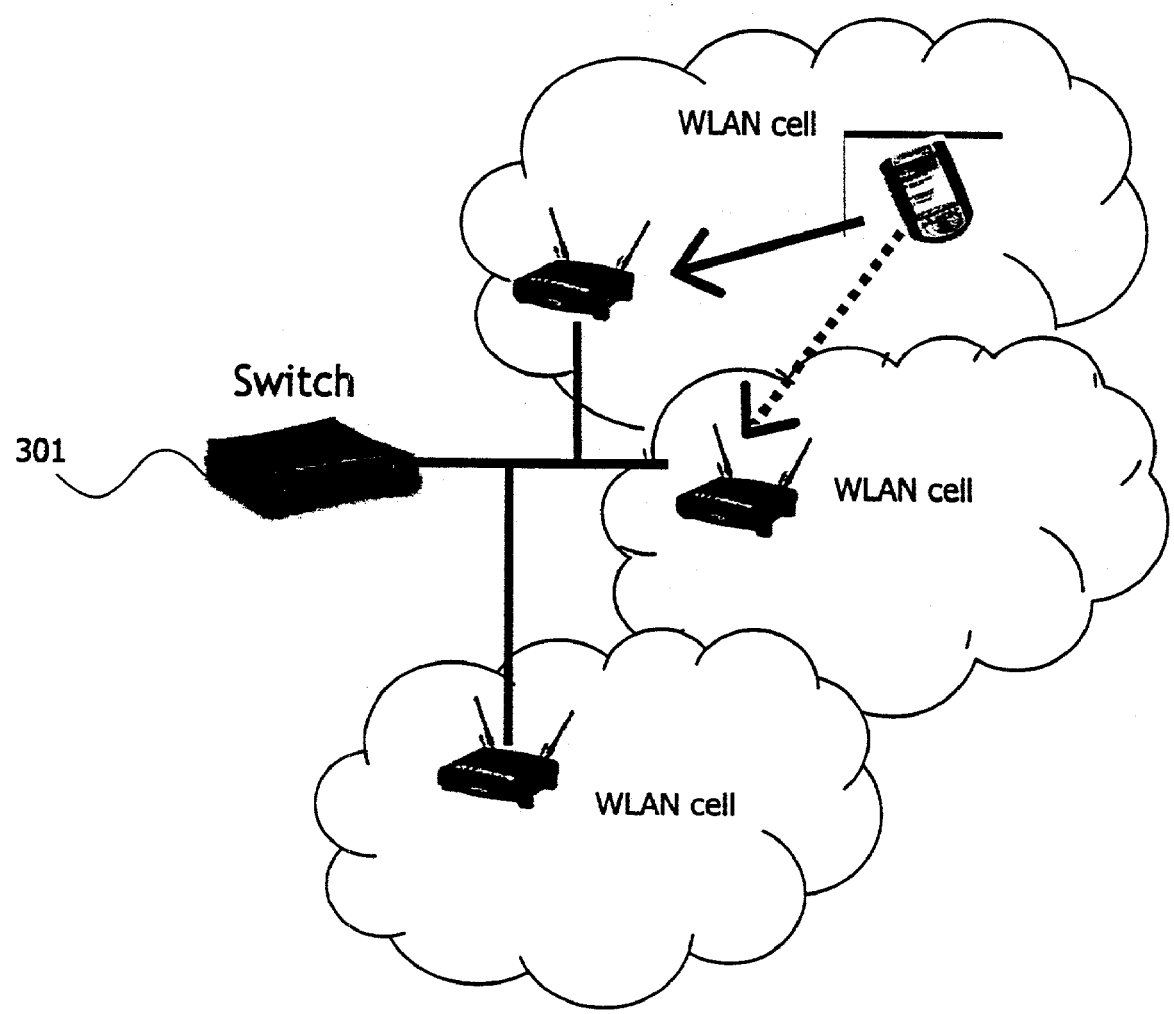
FIG. 5A illustrates one technique for location tracking by RSSI.

FIG. 5A illustrates one technique for location tracking by RSSI. Referring to FIG. 5A, switch 301 obtains the RSSI for each packet received by the repeaters and may have multiple RSSI values for a packet when that packet is received by two or more different repeaters. More specifically, a mobile station communicates with two (or more) repeaters and one repeater is going to have a stronger received signal strength than the other for the same packet. Based on this information, switch 301 is able to determine that a mobile station is closer to one repeater than the other. By continually monitoring the received signal strength, switch 301 can track the movement of a mobile station with respect to the repeaters.

Figure 5B:
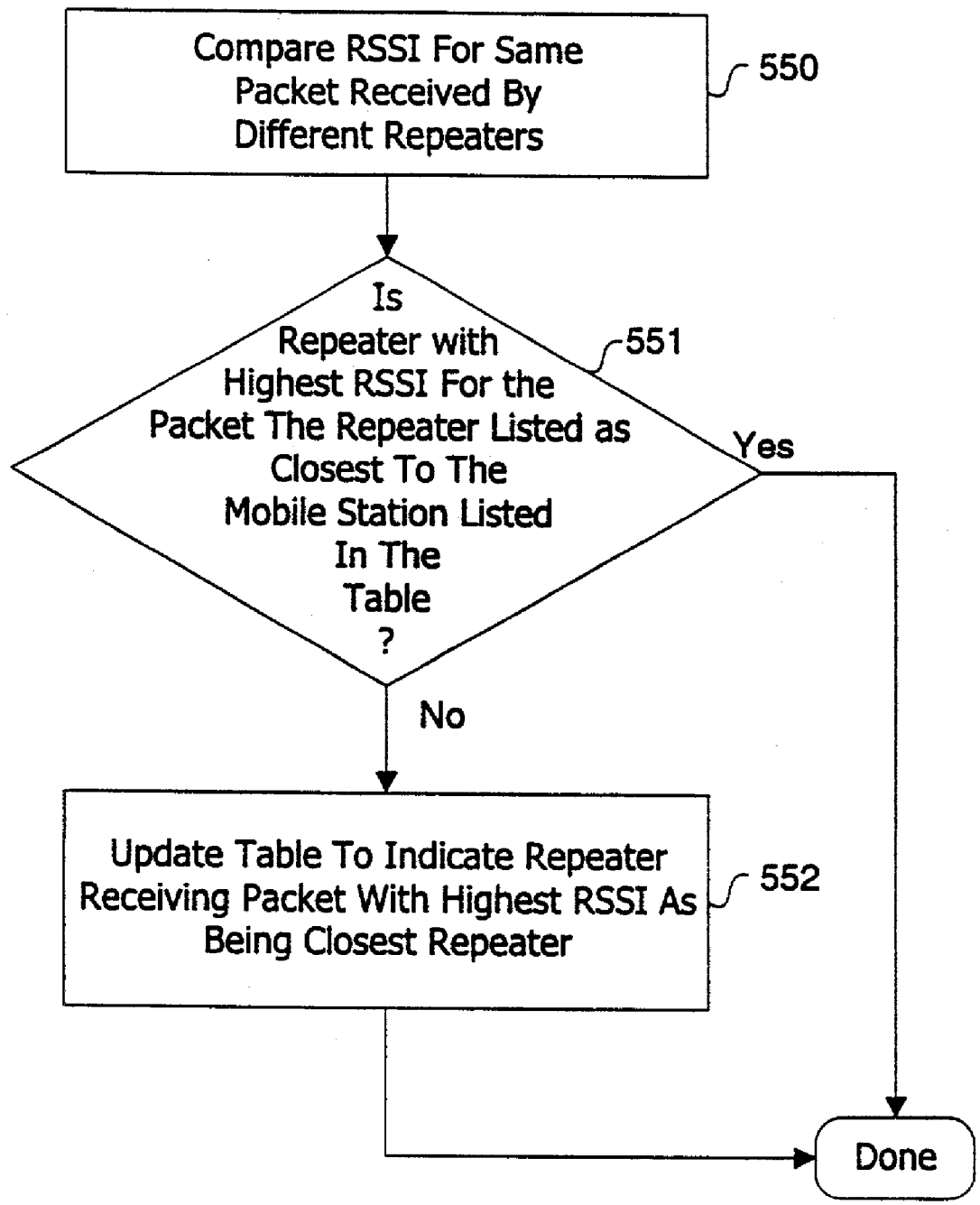
FIG. 5B is a flow diagram of one embodiment of a process for performing location tracking by a switch.

FIG. 5B is a flow diagram of one embodiment of a process for performing location tracking by a switch. The process is performed by processing logic that may comprise hardware (circuitry, dedicated logic, etc.), software (such as is run on a general purpose computer system or a dedicated machine), or a combination of both. In one embodiment, the processing logic comprises a network processor in the switch (e.g., network processor 1206 of FIG. 12).

Referring to FIG. 5B, processing logic compares the RSSI for the duplicate packets received by different repeaters from a mobile station (processing block 550) and tests whether the repeater with the highest RSSI for the packet is the repeater listed as closest to the mobile station in a location tracking table (e.g., database) (processing block 551). If not, processing logic updates the table to indicate that the repeater that received the packet with the highest RSSI is the closest repeater (processing block 552). Processing logic also switches port assignment for the mobile station to the new repeater.

In one embodiment, the location tracking table may include a listing of mobile stations and their individually assigned repeaters. This table may also include, or include instead of the assigned repeater, an indication of the switch port by which the switch is to communicate with the repeater assigned to each mobile station.

Mobility Supported by Routing

Figure 6A:
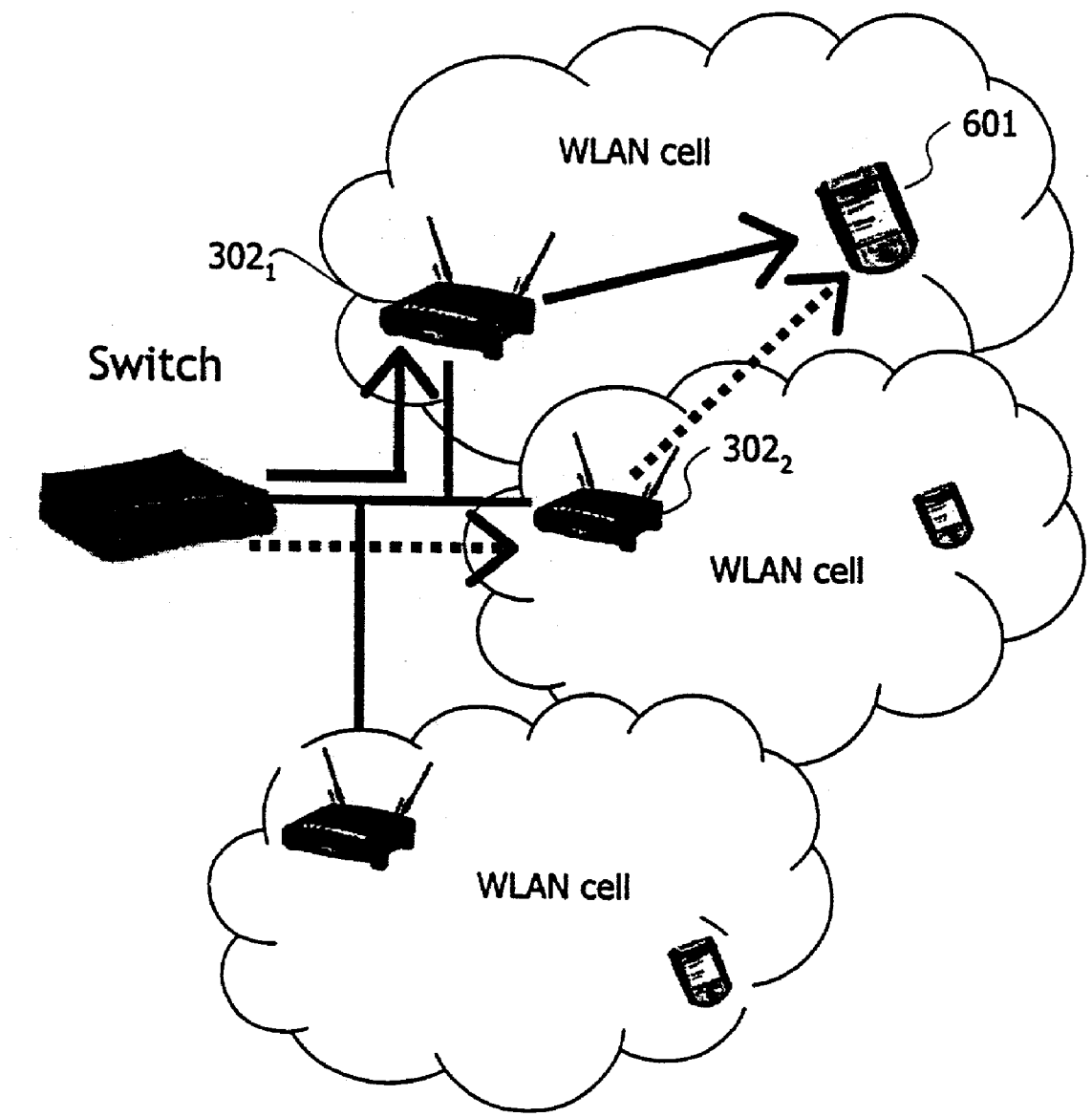
FIG. 6 illustrates mobility supported by routing.

FIG. 6A illustrates mobility supported by routing. Referring to FIG. 6A, the dotted arrow path for communication from switch 301 to mobile station 601 through repeater 302$_2$ is the original communication path with the network. As the mobile station 601 moves, a routing handoff occurs so that communication occurs over the solid arrowed path. In order to accomplish this handoff, switch 301 reroutes the packet to a different port. For example, if the first communication path illustrated as the dotted line arrow was on port 1, switch 301 may switch the packet to port 5, the port that associated with the communication path through repeater 302$_0$. Thus, mobility is supported by simply moving a packet to a different port of switch 301 that is assigned to a different repeater. In such a situation, the mobility provisions of the 802.11 protocol may be ignored.

In one embodiment, switch 301 determines that a particular mobile station is closer to a different repeater (by monitoring the received signal strength of duplicate packets). As described above, switch 301 maintains a table (e.g., database) of all mobile stations in the 802.11 network and includes an indication of the repeater closest to each mobile station. Switch 301 performs port-based routing and may use the table in the same manner an IP routing table is used. Switch 301 has an Ethernet port for each repeater. When switch 301 determines that a mobile station is closer to a repeater that is different than the one listed in the database (based on the received signal strength of duplicate packets among multiple repeaters), then switch 301 updates the database. Thereafter, if a packet is received by switch 301 for that mobile station, switch 301 merely sends it out on the Ethernet port assigned to the repeater that was most recently determined to be the closest to that mobile station.

Multi-Switch System

Figure 7:
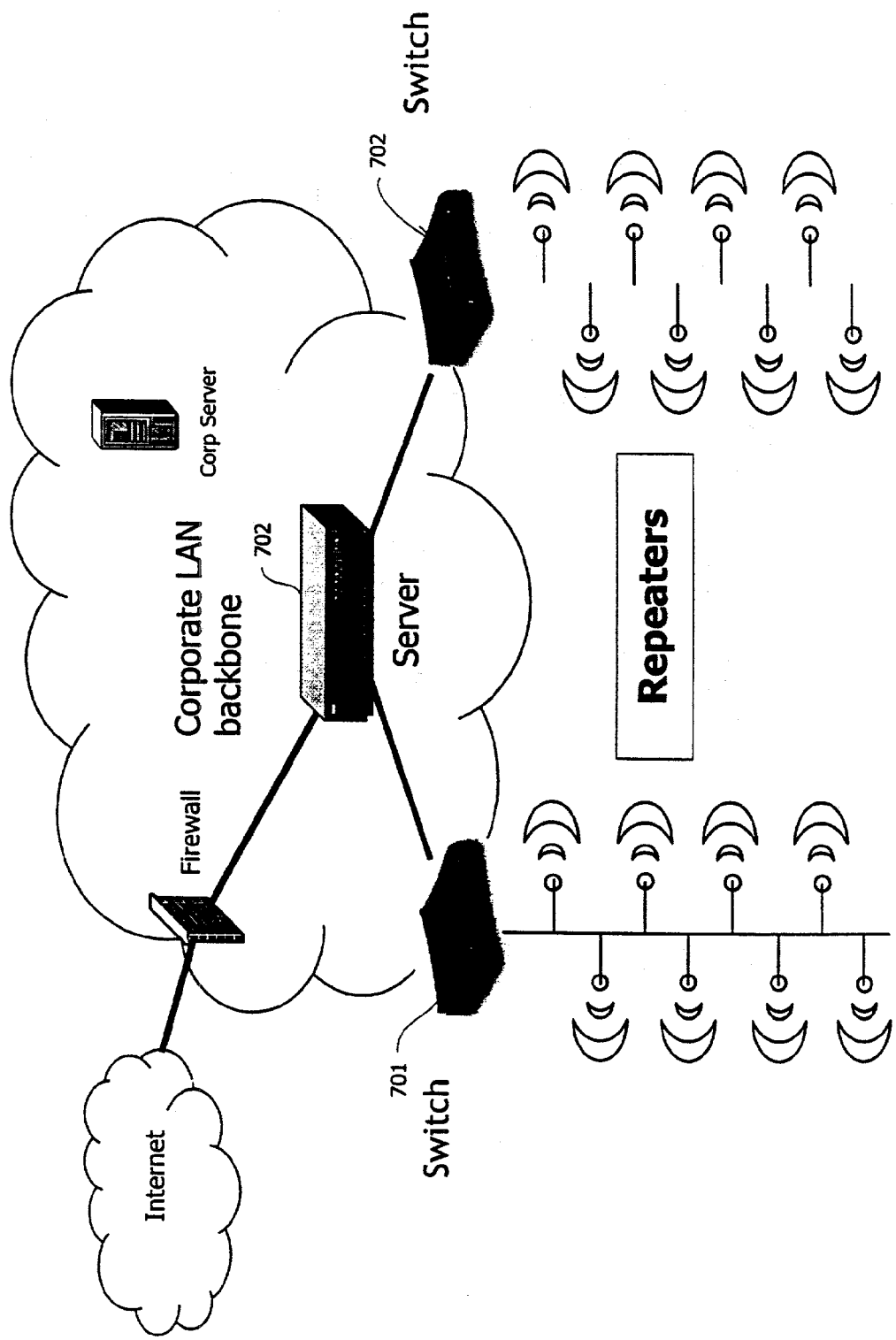
FIG. 7 illustrates one embodiment of a network system.

FIG. 7 illustrates one embodiment of a multi-switch system. Referring to FIG. 7, the network architecture includes switches 701 and 702 are communicably coupled to server 712. In one embodiment, server 712 is part of a LAN backbone through which access to the Internet and incorporates other resources made. Alternatively, server 712 may act as an interface to another portion of the communication system. Each of switches 701 and 702 is coupled to one or more repeaters in the same manner as described above with respect to FIG. 3. In still another embodiment, server 712 may exist within one of, or both, switches 701 and 702.

Protocol Architecture

Figure 8:
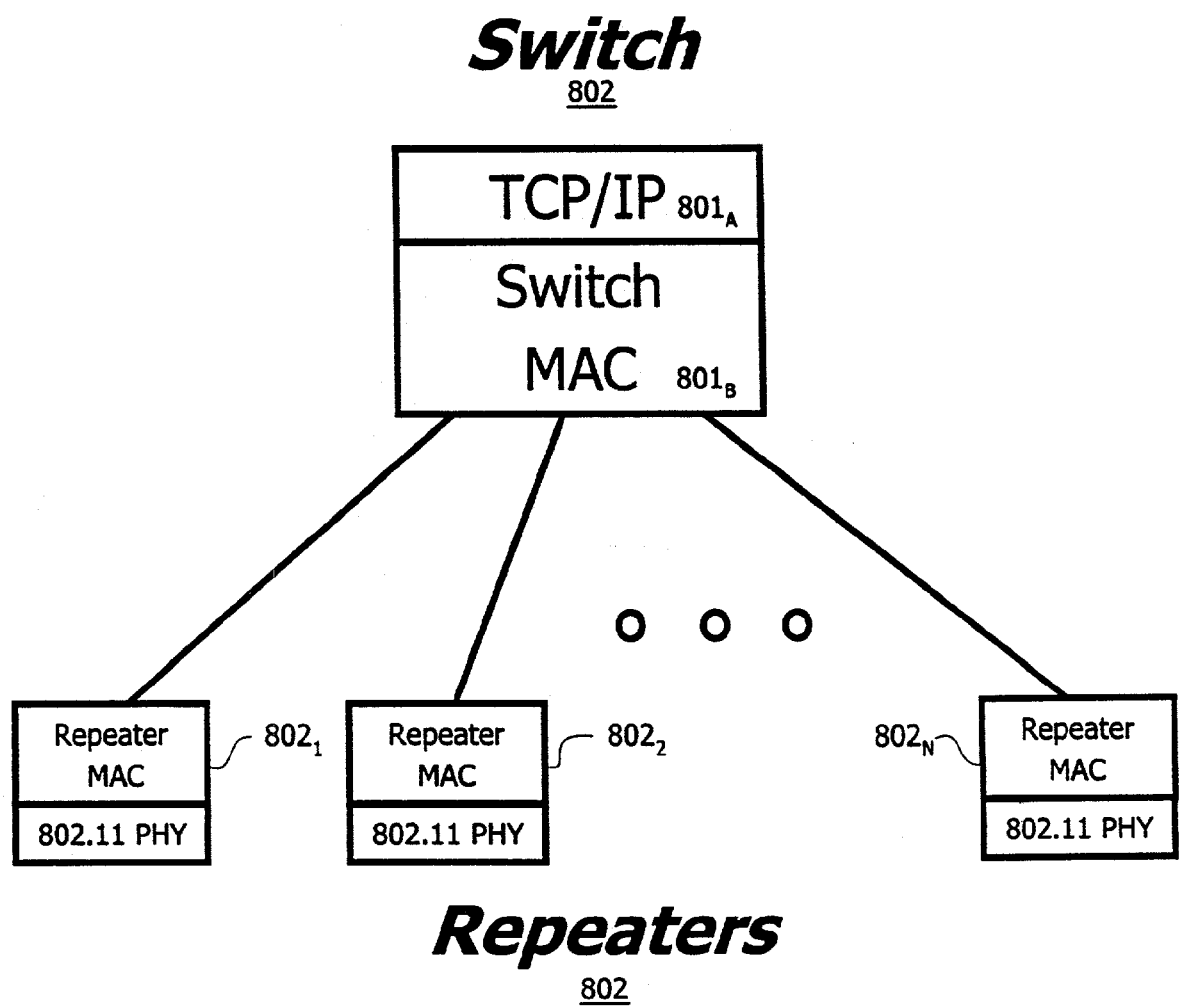
FIG. 8 illustrates one embodiment of a protocol architecture.
Figure 9A:
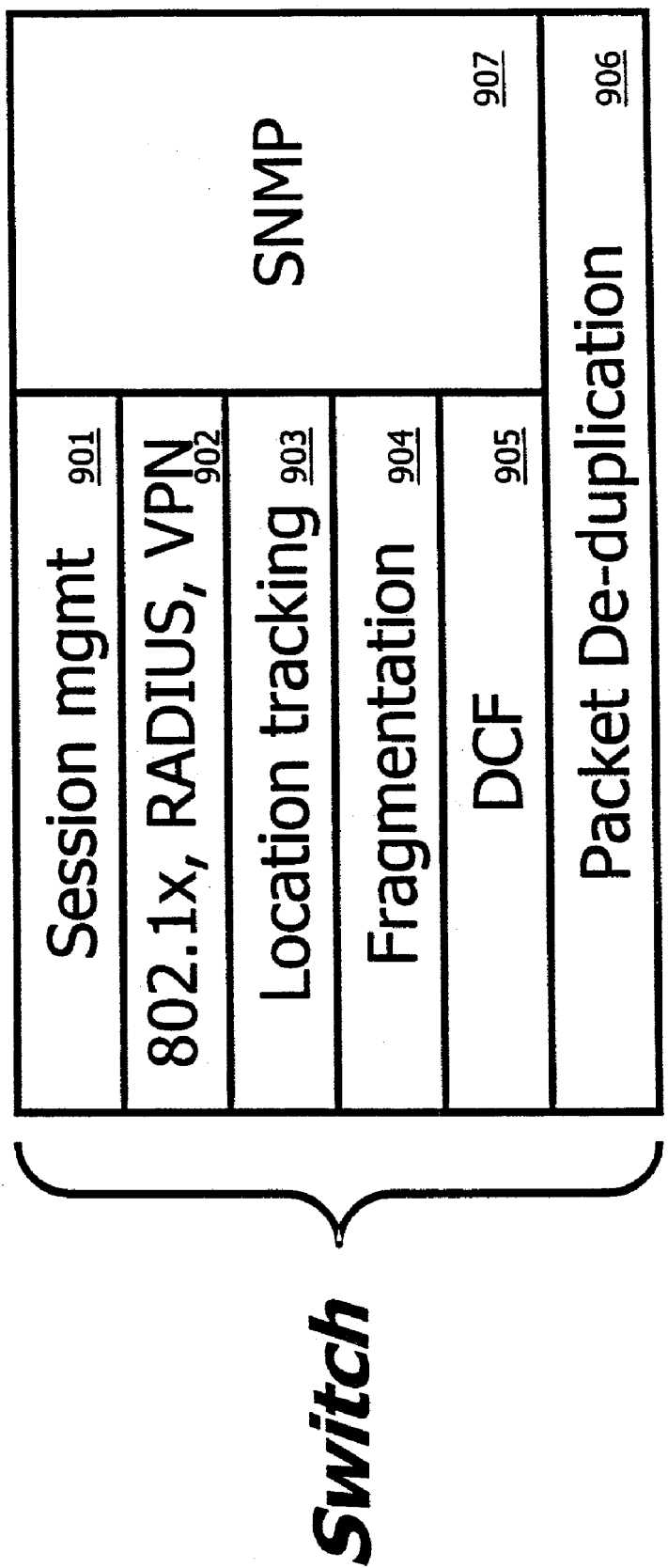
FIG. 9A illustrates one embodiment of a rotation tracking system.
Figure 9B:
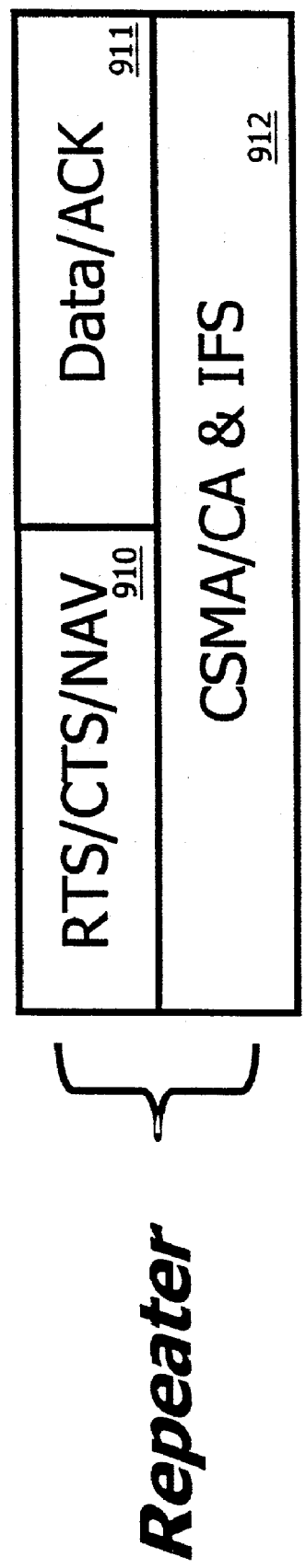
FIG. 9B illustrates one embodiment of a repeater.

FIG. 8 illustrates one embodiment of a protocol architecture. Referring to FIG. 8, switch 801 is shown having a network layer 801A and a MAC layer 801B. In one embodiment, the network layer 801A comprises a TCP/IP network layer. MAC sublayer 801B communicates with a MAC sublayer of each of repeaters $802_1$–$802_N$. Thus, in contrast to the prior art in which the 802.11 MAC layer is completely within the access point, the 802.11 MAC layer is split between switch 301 and repeaters $802_1$–$802_N$, and the MAC sublayer of the repeaters performs much less functionality than the MAC sublayer of the access points described above.

In one embodiment, the repeater MAC sublayer is responsible for performing portions of the 802.11 protocol including handling CSMA/CA, DIFS/EIFS interframe spacing (IFS) timing, SIFS timing and control, beacon frames (during transmit only), generating acknowledgement (of ACK) frames (during transmit only) on data packets received, such as 802.11 data frames and generating CTS (clear-to-send) frames in response to RTS (request-to-send) frames. The repeater MAC sublayer may also respond to the resetting of internal network allocation vectors (NAVs) which are embedded into (e.g., RTS and CTS frames). Each of the above repeater MAC functions may be implemented in a manner that is well-known is the art.

In addition to the MAC sublayer, each of repeaters $802_1$–$802_N$ includes an 802.11 physical layer or other wireless physical layer.

The switch MAC sublayer is responsible for handling multiple frame types during reception from the repeaters. In one embodiment, the MAC frame types the switch is capable of handling include an association request, reassociation request, probe request, ATIM, disassociation, authentication, deauthentication, PS-Pol, CTS (updates NAV in repeaters), ACK (in response to data frames), data and Null.

Figure 10:
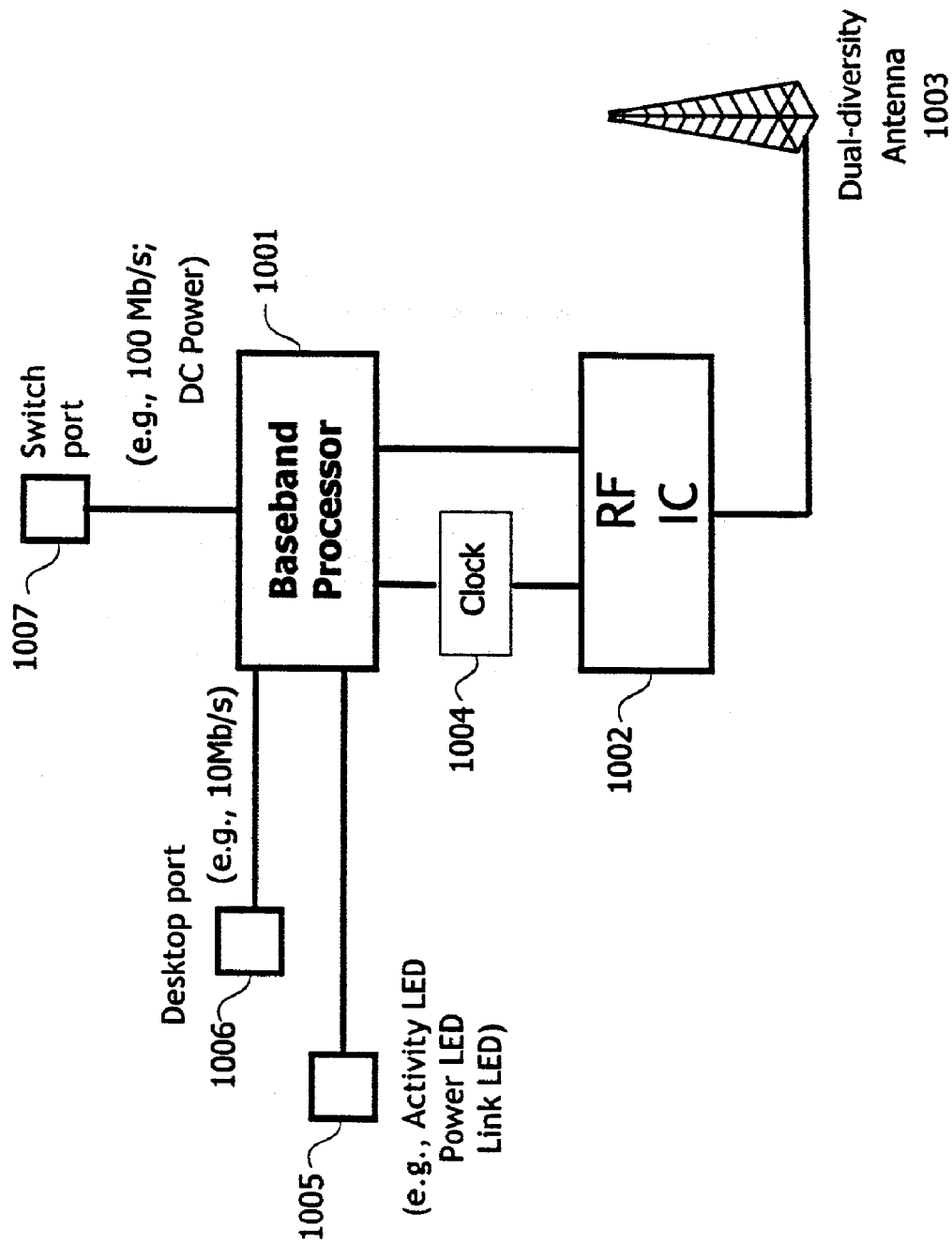
FIG. 10 illustrates one embodiment of a hardware architecture for a repeater.

The switch MAC frame types that are accommodated during transmission include an association response, a reassociation response, probe response, ATIM, disassociation, deauthentication, PS-Pole, data, Null and RTS (updates NAV in repeater). It should be noted that the MAC frame types that the switch accommodates during receive and transmit are well known in the arts and part of the 802.11 standard. Each of the above switch MAC functions may be implemented in a manner that is well-known is the art FIG. 10 illustrates one embodiment of a hardware architecture for a repeater. Referring to FIG. 10, an RF chip 1002 receives and transmits RF transmissions using antenna 1003. In one embodiment, RF chip 1002 comprises a standard 802.11 RF chip. In one embodiment, antenna 1003 comprises a dual-diversity antenna. Communications received by RF chip 1002 are forwarded on to baseband processor 1001, which is a digital chip that is described in further detail below. Similarly, transmissions to be sent are received by RF chip 1002 from baseband processor 1001.

Baseband processor 1001 is a digital chip that performs the reduced MAC functions as described above. The repeater also includes a port for coupling to switch, port 1007. Baseband processor 1001 handles communication with switch 301 using this port. In one embodiment, this port also transfers information through the port at 100 Mb/s bits per second. Port 107 may also provide power to baseband processor 1001.

A desktop port 1006 may be included to allow desktop or other systems to plug into the repeater. Also, in one embodiment, an LEDs 1005, such as an activity LED, power LED, and/or link LED, may be included in the repeater as well.

Figure 11:
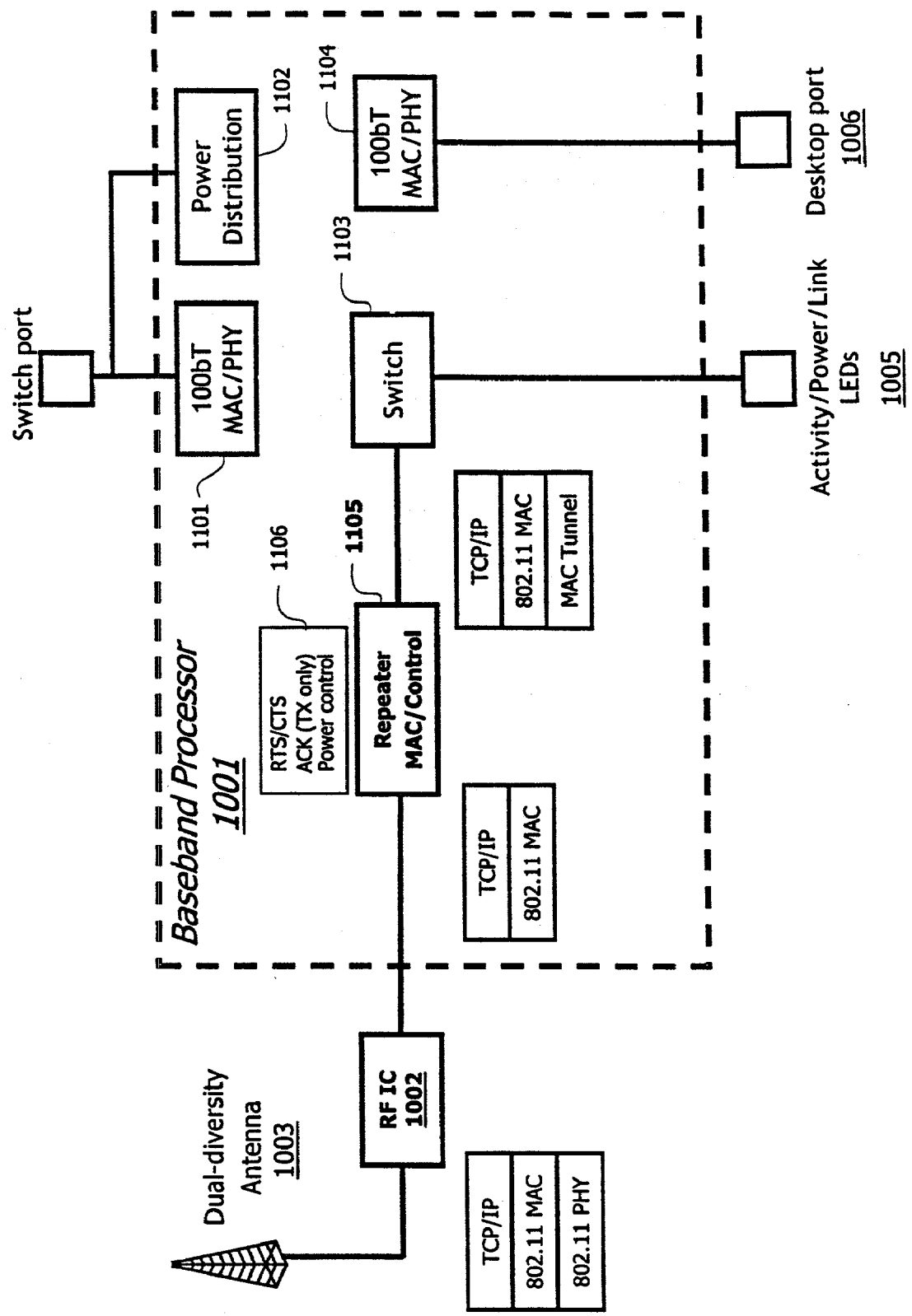
FIG. 11 is a block diagram of one embodiment of the base stand processor of a repeater.

FIG. 11 is a block diagram of one embodiment of the baseband processor of a repeater. Baseband processor 1001 includes a repeater MAC and control unit 1105 that interfaces with RF chip 1002 using a protocol. In one embodiment, the interface comprises a TCP/IP layer and an 802.11 MAC sublayer. The repeater MAC/control unit 1105 is coupled to switch 1103. In one embodiment, MAC/control unit 1105 communicates with switch 1103 using a TCP/IP layer and an 802.11 MAC sublayer tunneled inside Ethernet packets. Switch 1103 is also coupled to MAC/PHY layer unit 1104 which interfaces the baseband processor to desktop port 1006. Switch 1103 is also coupled to the activity/power/link LEDs 1005. Similarly switch 1103 is coupled to the MAC/physical layer unit 1001 that interfaces the rest of the components on baseband processor 1001 to switch port 1007 via switch 1103. Also coupled to switch port 1007 is a power distribution unit 1102. In one embodiment, power distribution unit obtains power from the CAT5 wiring and provides it to the rest of baseband processor 1001.

Figure 12:
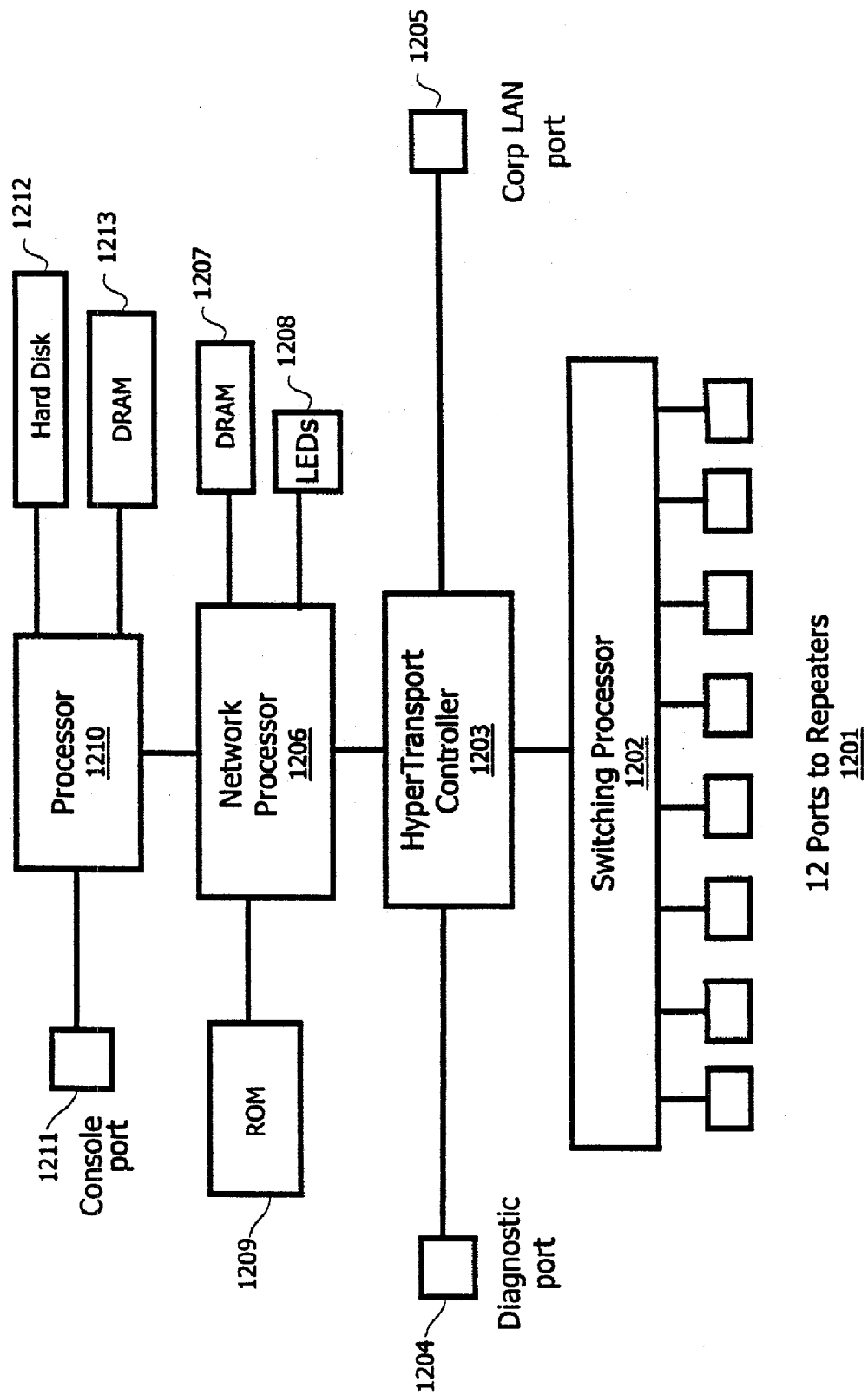
FIG. 12 is a block diagram of one embodiment of a switch.

FIG. 12 is a block diagram of one embodiment of a switch. Referring to FIG. 12, the switch includes one or more ports 1201 to repeaters 1201. Although 12 are shown, any number may be included. Ports 1201 are coupled to a switching processor 1202. In one embodiment, switching processor 1202 switches 13 ports of gigabit Ethernet and allows broadcast packets to be received on one port and broadcast on the others without involving the rest of the switch. In one embodiment, switching processor 1202 comprises a Broadcom BRCM 5633 gigabit switching processor.

HyperTransport controller 1203 is coupled to switching processor 1202 and provides a gigabit ethernet interface to the rest of the switch architecture. In one embodiment, the HyperTransport controller 1203 includes a diagnostic porthole 1204 and another ethernet port 1205 for use, for example, coupled to a corporate LAN.

In one embodiment, HyperTransport controller 1203 comprises a Galaileo HyperTransport controller sold by Marvell.

A network processor 1206 is coupled to HyperTransport controller 1203 and performs the majority of the functions of the switch, including the receiver diversity functions and location-tracking functions described above, with the exception of the rebroadcast of the broadcast packets received by the switch, which is handled by switching processor 1202. In one embodiment, network processor 1206 is coupled to a boot memory 1209, a DRAM 1207 and one or more LED's 1208. In one embodiment, network processor 1206 comprises a PMC-Sierra RM9000X2 sold by PMC-Sierra, boot memory 1209 comprises an MB boot flash AMD AM29LV640D boot flash memory and DRAM 1207 comprises 64 MB synchronous DRAM (SDRAM).

In one embodiment, the network processor 1206 includes a PCI interface to a processor 1210. Processor 1210 may host certain applications, such as, for example, firewall applications. Processor 1210 may perform these functions with the use of hard disk 1211, DRAM 1213 and console port 1211. Console port 1211 may provide access to a monitor or keyboard or other peripheral device. In one embodiment, processor 1210 comprises a pentium processor manufactured by Intel Corporation of Santa Clara, Calif.

In one embodiment, network processor 1206 executes software instructions, which performs the 802.11 MAC layer. Network processor 1206 may also execute a wireless LAN configuration module to configure the wireless LAN network, a priority traffic administration (e.g., traffic shaping) module, a management software (e.g., Cisco IOS), a security protocol (e.g., 802.1x) module, and a VPN/firewall module. Processor 1210 executes a location tracking module to perform the location tracking. Processor 1210 may also execute one or more of the following software modules: clustering/HA, RADIUS/DHCP, session mobility, third party applications, XML Web services, user administration software, and network management software.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
    receiving information from each of a plurality of repeaters indicating which of a plurality of packets wirelessly transmitted by a mobile station were received by each repeater and a signal strength at which each of the wirelessly transmitted packets was received;
    identifying an individual one of the plurality of wirelessly transmitted packets that was received by each of the plurality of the repeaters; and
    determining a location of the mobile station with respect to the plurality of repeaters based on comparing one to the other the signal strengths at which the individual packet was received at each of the plurality of repeaters.

2. The method defined in claim 1 further comprising storing information indicating which repeater is closest to the mobile station.

3. The method defined in claim 2 further comprising:
    setting a switch port assigned to the repeater closest to the mobile station; and
    sending a packet with a destination address being the mobile station via a switch port associated with the repeater that is closest to the mobile station.

4. The process defined in claim 1 wherein the wirelessly transmitted packets are transmitted according to the 802.11 family of protocols.

5. The process defined in claim 1 wherein the mobile station in one selected from a group consisting of a mobile phone, a cellular phone, a cordless phone, a headset, a voice-enabled mobile station, a laptop computer system, and a personal digital assistant or any computer-data-enabled mobile station.

6. A system comprising:
    a mobile station having a transmitter to transmit packets wirelessly;
    a plurality of repeaters communicably coupled with the mobile station, wherein each of the plurality of repeaters receives one or more of a plurality of wirelessly transmitted packets from the mobile station and forwards received packets with corresponding received signal strength indicators; and
    a switch coupled to the plurality of repeaters to receive forwarded packets from each of the plurality of repeaters and to perform location tracking of the mobile stations based on an identification of an individual one of the plurality of wirelessly transmitted packets that was received by each of the plurality of repeaters and a comparison one to the other of the received signal strength indicators associated with the individual packet.

* * * * *